A. L. COLE.
VEHICLE TIRE.
APPLICATION FILED FEB. 7, 1918.

1,305,196. Patented May 27, 1919.

Inventor:
Albert L. Cole
by Francis J. Dakin
Atty.

UNITED STATES PATENT OFFICE.

ALBERT L. COLE, OF AUBURNDALE, MASSACHUSETTS.

VEHICLE-TIRE.

1,305,196.  Specification of Letters Patent.  Patented May 27, 1919.

Application filed February 7, 1918. Serial No. 215,737.

*To all whom it may concern:*

Be it known that I, ALBERT L. COLE, a citizen of the United States, residing at Auburndale, in the county of Middlesex and State of Massachusetts, have invented a new and useful Improvement in Vehicle-Tires, of which the following is a specification, reference being had therein to the accompanying drawings.

This invention relates to pneumatic tires for automobiles and other vehicles.

The main object of the invention is to provide a pneumatic tire so constructed as to secure great durability and long life combined with resiliency and flexibility.

A further object of the invention is to provide a form of tire in which blow outs are obviated and the liability to punctures reduced to a minimum.

Another object is to obtain resiliency without deterioration or rapid wear or disintegration of the shoe.

In brief, my invention contemplates a pneumatic tire made up of a shoe of any suitable construction, such, for instance, as is in common use at the present time, and an inner pneumatic member composed of two endless bands secured together at their longitudinal edges and sealed against leakage of air.

Figure 1:
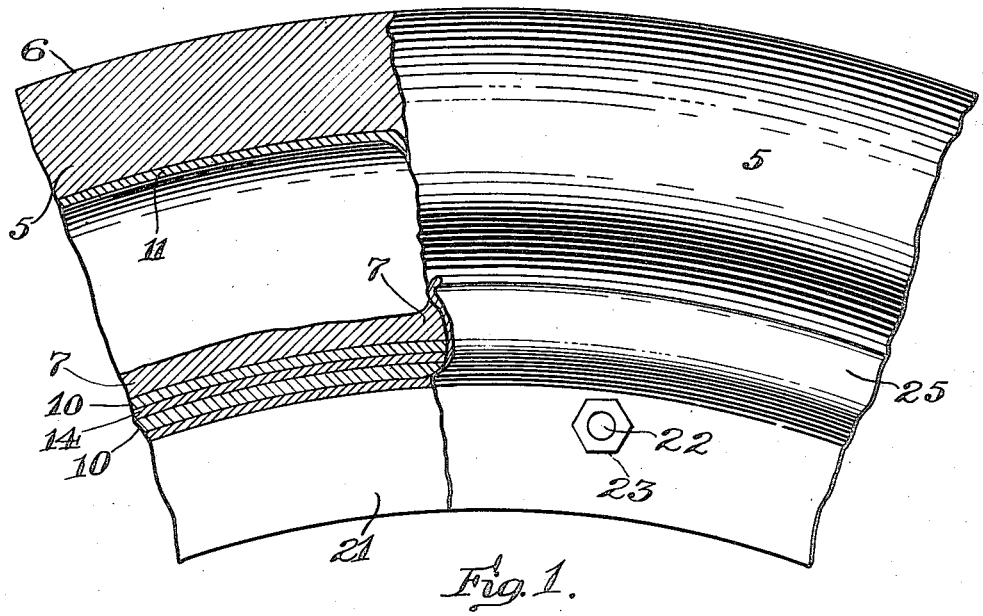
Figures 2, 3:
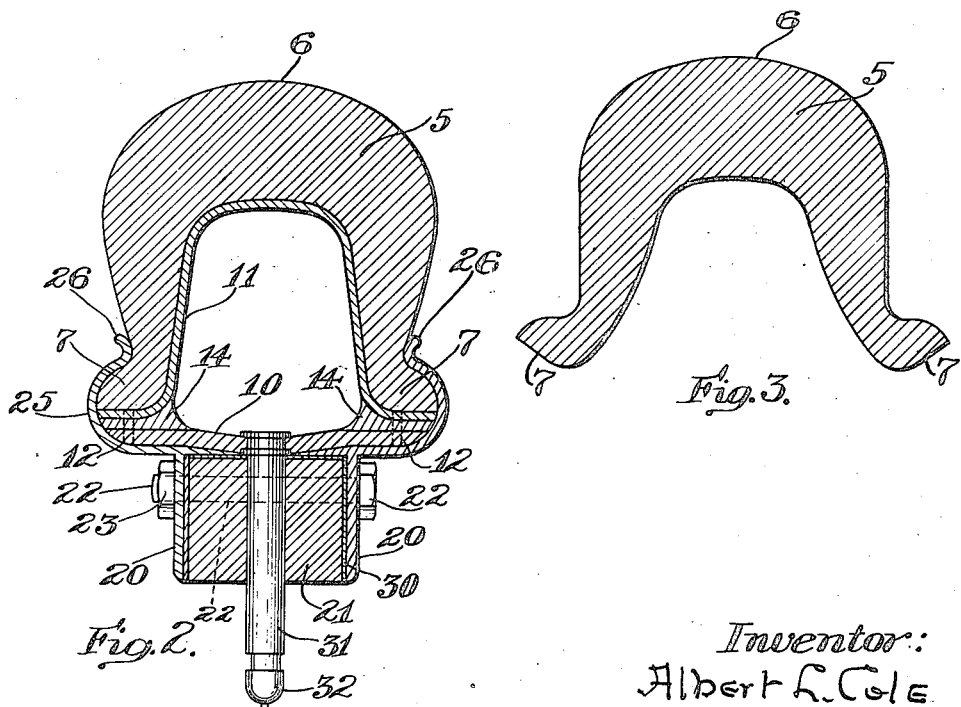

In the drawings illustrating the preferred embodiment of my invention, Figure 1 is a side elevation of a portion of a tire constructed in accordance with my invention, a portion being cut away to show the interior arrangement; Fig. 2 is a cross-sectional view of the tire in assembled relation and mounted on a wheel rim; and Fig. 3 is a cross-sectional view of a shoe before it is assembled with the pneumatic member upon the wheel rim.

In the illustrated embodiment of the invention, the tire comprises a shoe 5 of any suitable construction, having a tread portion 6 and longitudinal side lips or beads 7, and an inner pneumatic member made up of two endless bands 10 and 11, secured together at their longitudinal edges by stitching 12 or in any other suitable manner such as by cementing. As shown in the drawings, the shoe is preferably made without fabric reinforcements and of a rubber composition of the same texture throughout. The side walls and tread of the shoe are in such case made unusually thick, thus tending to give the shoe a supporting power of itself as well as a long life.

Although the pneumatic member may be made in various ways, I prefer to construct it as shown in Fig. 2 with the band 10 substantially flat serving as a base, and the band 11 of much greater width and domed so as to form the tube. Between their longitudinal edges on each side, I may interpose a gusset 14 of any suitable material, such as rubber composition, which has its inner edge thickened to form a wedge between the two bands to assist in sealing the side joint against air leakage. The pneumatic member may be made of various rubber compounds or compositions, or even of canvas or other fabric, coated or permeated with rubber or other material to make it air tight. When made of rubber composition, I prefer to use a compound which is tough and dense of structure so that the pneumatic member will have some sustaining capacity of itself and, at the same time, be difficult to puncture. If made of canvas or other fabric, it will be found that that material when thick enough will have the qualities noted above.

The shoe 5 is preferably molded in the shape shown in Fig. 3 with its sides turned outwardly in order that when assembled the sides are forced inwardly against the tension of the material which causes the lips to bear against the holding means to form a water tight joint even when the pneumatic member is not filled with air under pressure.

Although I prefer to use a shoe such as I have just described, it is to be understood that my invention contemplates the use of other kinds of shoes such as, for instance, those ordinarily used on automobiles.

For holding my tire upon the wheel felly, various devices may be employed and one such is shown consisting of two rings 20, secured to the wheel felly 21 by bolts 22 and nuts 23; each ring being provided with a flange 25 which on one side projects inwardly over the tread of the felly and serves as a bevelel seat for the pneumatic member when assembled, and on the other side curves outwardly to inclose one side of the two bands 10 and 11 and one lip 7 of the shoe. At its outer edge the flange 25 is turned over to form a lip 26 serving to support the shoe when it is bent over in turning corners at speed. The lip 26 also presents a curved surface to the side of the shoe, thereby obviating what might be termed "rim cutting." If desired, the wheel felly may be provided with a metallic covering 30 to insure an accurate fit between the wheel felly and the flanged rings 20.

In assembling my tire upon the wheel felly, the pneumatic member is first mounted within the shoe and the two together are placed upon the wheel felly 21, the ordinary valve stem 31, with a cap 32 carried by the pneumatic member being arranged in the ordinary way through the felly as shown in Fig. 3. The two rings are next adjusted in position, first on one side and then on the other and are drawn together in any suitable manner, as by draw bolts. Ordinarily the bolts 22, by being made a trifle longer than necessary, may be utilized for this purpose.

After the tire has been assembled, the pneumatic member may be filled with air under pressure through the valve stem 31 in the usual manner. With the preferred form of tire as herein illustrated, it will be found that an air pressure of thirty to forty pounds will give far more satisfactory results than the high pressure of seventy to eighty pounds in general use today. Resiliency in ordinary tires is greatly increased by using a low pressure, but the rapid deterioration of the ordinary shoes and inner tubes, due to running with low pressure, so increases the expense that most users find it preferable to sacrifice resiliency for economy. In my tire, however, a low pressure can be used without deterioration or undue wear. This resiliency is also increased by the fact that the tire has a certain self-supporting capacity which keeps it up to a sufficient extent to permit a low pressure to be used.

It is to be observed that blow outs are entirely obviated by using a heavy construction of pneumatic member with a low air pressure. At the same time punctures are practically eliminated; because, few if any nails or tacks can penetrate through the outer shoe and those few seldom have sufficient additional penetration to puncture the comparatively thick walls of the pneumatic member.

Another advantage of my invention resides in the fact that the pneumatic member is entirely inclosed and protected from the atmosphere and from moisture and dirt. This increases the life of the inner member of the tire and does away with the rotting of inner tubes so noticeable in the ordinary tires.

What I claim is:—

1. The combination of a wheel rim, a shoe and a pneumatic member interposed between said shoe and said rim, said pneumatic member being composed of two endless bands secured together and sealed against air leakage at their longitudinal edges, said edges extending outwardly between said rim and the lips of said shoe.

2. In a vehicle tire, a pneumatic member made up of two endless bands secured together along their longitudinal edge portions to form a tube with said marginal edge portions extending outwardly therefrom.

3. The combination of a wheel rim, a shoe mounted thereon and a pneumatic member interposed between said rim and said shoe, said pneumatic member being made up of two endless bands secured together at their longitudinal edge portions with their inner surfaces in face to face relation and one of said bands being of greater width than the other to permit of a transverse curvature to form an endless tube.

4. The combination of a wheel rim, a shoe mounted thereon and a pneumatic member interposed between said rim and said shoe, said pneumatic member being made up of two endless bands secured together at their longitudinal edge portions with their inner surfaces in face to face relation and one of said bands being of greater width than the other to permit it to engage the inner surface of the shoe when said pneumatic member is distended.

5. The combination of a rim, a shoe and a pneumatic member interposed between said shoe and said rim, said pneumatic member being composed of two endless bands secured together at their longitudinal edges, said edges extending outwardly between said rim and the lips of said shoe.

6. A tire comprising a shoe and a pneumatic member inclosed thereby, said pneumatic member being made up of two endless bands secured together at their longitudinal edges in a face to face relation, one of said bands being substantially cylindrical and the other of said bands being of much greater width than the first mentioned band and being domed to fill the interior of said shoe, said two bands together forming a tube with the longitudinal edges engaging the lips of said shoe.

7. A tire comprising a shoe and a pneumatic member inclosed thereby, said pneumatic member being made up of two endless bands secured together at their longitudinal edges, one of said bands being of greater width than the other and being curved transversely to form a tube filling the interior of said shoe, the longitudinal edges of said domed band being in engagement with the lips of said shoe.

8. The combination of a wheel rim, a shoe mounted thereon, a pneumatic member inclosed within said shoe, said pneumatic member being composed of two endless bands secured together at their longitudinal edges to form a tube, one of said bands being substantially cylindrical and in engagement with the wheel rim and the other of said bands being of much greater width than the first mentioned band and being domed to form a tube and means for holding said shoe and said pneumatic member on said rim.

9. In a vehicle tire, a pneumatic member made up of two endless bands secured together at their longitudinal edges with their inner surfaces in face to face relation, one of said bands being of greater width than the other to permit of a transverse curvature to form an endless tube.

10. The combination of a wheel rim, a shoe mounted thereon, a pneumatic member interposed between said shoe and said rim, said pneumatic member being composed of two endless bands of flexible material secured together at their longitudinal edges in a face to face relation, one of said bands being substantially cylindrical and in engagement with said rim and the other of said bands being of much greater width than the first mentioned band and being domed to fill said shoe, said two bands together forming a tube.

11. The combination of a wheel rim, a shoe mounted thereon, a pneumatic member interposed between said shoe and said rim, said pneumatic member being composed of two endless bands of flexible material secured together at their longitudinal edges in a face to face relation, one of said bands being substantially cylindrical and in engagement with said rim and the other of said bands being of much greater width than the first mentioned band and being domed to fill said shoe, said two bands together forming a tube, the longitudinal edges of said bands being held between the lips of said shoe and said rim.

In witness whereof, I hereunto set my hand this fifth day of February, 1918.

ALBERT L. COLE.